US011899312B2

(12) United States Patent
Choi et al.

(10) Patent No.: US 11,899,312 B2
(45) Date of Patent: Feb. 13, 2024

(54) DISPLAY APPARATUS HAVING BACK-LIGHT UNIT AND LIQUID CRYSTAL PANEL

(71) Applicant: LG DISPLAY CO., LTD., Seoul (KR)

(72) Inventors: Jae Yeong Choi, Daegu (KR); Joon Ho Lee, Daegu (KR); Dae Yun Im, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/549,265

(22) Filed: Dec. 13, 2021

(65) Prior Publication Data
US 2022/0206335 A1  Jun. 30, 2022

(30) Foreign Application Priority Data
Dec. 29, 2020  (KR) .................. 10-2020-0186518

(51) Int. Cl.
G02F 1/13357 (2006.01)
G02F 1/1335 (2006.01)
G02F 1/1675 (2019.01)
G02F 1/13 (2006.01)
G02F 1/153 (2006.01)

(52) U.S. Cl.
CPC ...... *G02F 1/133615* (2013.01); *G02F 1/1323* (2013.01); *G02F 1/133512* (2013.01); *G02F 1/133524* (2013.01); *G02F 1/153* (2013.01); *G02F 1/1675* (2019.01); *G02F 2201/44* (2013.01)

(58) Field of Classification Search
None
See application file for complete search history.

(56) References Cited

U.S. PATENT DOCUMENTS

| | | | |
|---|---|---|---|
| 2004/0207595 A1* | 10/2004 | Chen | G02B 6/0028 345/102 |
| 2013/0265503 A1* | 10/2013 | Hosoki | G02B 6/0091 362/613 |
| 2016/0077364 A1* | 3/2016 | Shiota | G02F 1/1341 349/61 |
| 2019/0162997 A1* | 5/2019 | Asakura | G02F 1/133514 |
| 2019/0163020 A1* | 5/2019 | Ikeno | G02F 1/133606 |
| 2021/0215987 A1* | 7/2021 | Chen | G02F 1/155 |

FOREIGN PATENT DOCUMENTS

| | | | |
|---|---|---|---|
| CN | 106501991 A | * | 3/2017 |
| JP | H11-305679 A | | 11/1999 |
| KR | 10-2008-0001522 A | | 1/2008 |
| KR | 10-2018-0068293 A | | 6/2018 |

* cited by examiner

*Primary Examiner* — Shan Liu
(74) *Attorney, Agent, or Firm* — POLSINELLI PC

(57) ABSTRACT

A display apparatus includes a liquid crystal panel disposed on a back-light unit; and a viewing angle control unit disposed between the back-light unit and the liquid crystal panel, wherein the viewing angle control unit includes light-blocking patterns having a light-blocking material and variable patterns disposed between a first control electrode and a second control electrode, wherein the variable patterns are extended in a direction perpendicular to the light-blocking patterns, and wherein transmittance of each variable pattern is changed according to a voltage applied to the first control electrode and the second control electrode, thereby preventing a distraction of people around a user by selectively sharing a realized image.

11 Claims, 10 Drawing Sheets

FIG. 3
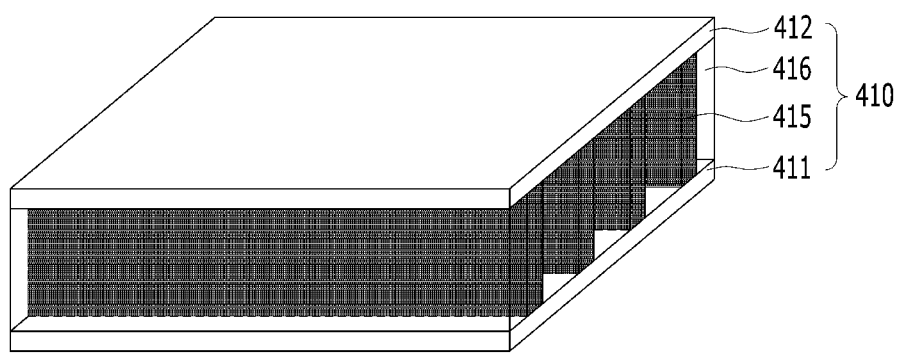
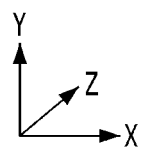
FIG. 4
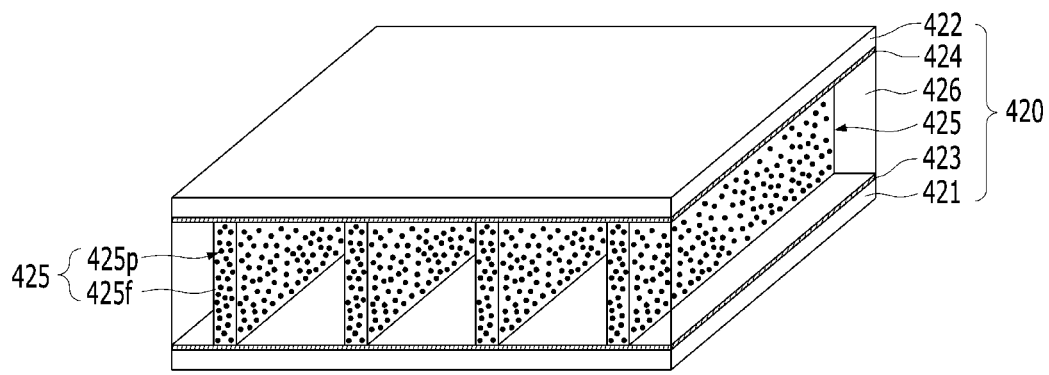
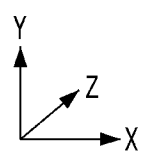

DISPLAY APPARATUS HAVING BACK-LIGHT UNIT AND LIQUID CRYSTAL PANEL

CROSS-REFERENCE TO RELATED APPLICATION

This application claims the priority of Korean Patent Application No. 10-2020-0186518 filed on Dec. 29, 2020, which is hereby incorporated by reference in its entirety as if fully set forth herein.

BACKGROUND

Field of the Disclosure

The present disclosure relates to a display apparatus in which a back-light unit and a liquid crystal panel are stacked.

Description of the Background

Generally, a display apparatus is provided to realize an image. For example, the display apparatus may include a liquid crystal panel disposed on a back-light unit. The back-light unit may provide light to the liquid crystal panel. The liquid crystal panel may realize the image using the light provided from the back-light unit.

The display apparatus may be used in various places. For example, the display apparatus may be installed in front of a passenger seat of a vehicle. The image realized by the display apparatus may be recognized by people around a user. For example, the image realized by the display apparatus which is installed in front of a passenger seat of a vehicle may be recognized by the driver of the corresponding vehicle. That is, the image realized by the display apparatus may disperse the driver's gaze, thereby increasing the possibility of an accident.

SUMMARY

Accordingly, the present disclosure is directed to a display apparatus that substantially obviates one or more problems due to limitations and disadvantages of the related art.

More specifically, the present disclosure is to provide a display apparatus capable of selectively limiting the viewing angle.

The present disclosure is also to provide a display apparatus capable of minimizing a visibility deviation caused by a change in a viewing angle.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve the above and other advantages and in accordance with the present disclosure, as embodied and broadly described herein, there is provided a display apparatus comprising a back-light unit. A liquid crystal panel is disposed on the back-light unit. A viewing angle control unit is disposed between the back-light unit and the liquid crystal panel. The viewing angle control unit includes light-blocking patterns and variable patterns. The light-blocking patterns includes a light-blocking material. The variable patterns are disposed between a first control electrode and a second control electrode. The variable patterns extend in a direction perpendicular to the light-blocking patterns. The transmittance of each variable pattern is changed according to a voltage applied to the first control electrode and the second control electrode.

The light-blocking material may include a black dye.

Each of the variable patterns may include a transparent fluid and black particles. The black particles may be dispersed in the transparent fluid.

Each of the variable patterns may be surrounded by a control insulating layer.

The back-light unit may include a light-guide plate and a light-source element. The light-guide plate may include a first side, a second side, a third side and a fourth side. The second side may be perpendicular to the first side. The third side may be opposite to the second side. The fourth side may be opposite to the first side. The light-source element may include a first light-source device, a second light-source device and a third light-source device. The first light-source device may be disposed on the first side of the light-guide plate. The second light-source device may be disposed on the second side of the light-guide plate. The third light-source device may be disposed on the third side of the light-guide plate.

The first side of the light-guide plate may extend in the same direction as the light-blocking patterns.

The first side of the light-guide plate may have a length longer than the second side and the third side of the light-guide plate.

The light-blocking patterns may be disposed between the first control electrode and the second control electrode.

In another aspect, there is provided a display apparatus comprising a back-light unit. A viewing angle control unit is disposed on the back-light unit. A liquid crystal panel is disposed on the viewing angle control unit. The viewing angle control unit includes light-blocking patterns and first variable patterns. The light-blocking patterns extend in a first direction. The first variable patterns extend in a second direction perpendicular to the first direction. The first variable patterns are disposed between a first control electrode and a second control electrode. Each of the first variable patterns includes an electrochromic material.

Each of the first variable patterns may include a metal oxide.

The first control electrode may include first electrode patterns. The first electrode patterns may extend side by side in the second direction. Each of the first variable patterns may overlap one of the first electrode patterns.

Each of the first variable patterns may have a horizontal width same as the corresponding first electrode pattern.

A first lower control substrate, a first upper control substrate, a second lower control substrate and a second upper control substrate may be sequentially disposed between the back-light unit and the liquid crystal panel. The light-blocking patterns may be disposed between the first lower control substrate and the first upper control substrate. The first control electrode, the variable patterns and the second control electrode may be sequentially stacked by the second lower control substrate and the second upper control substrate.

Second variable patterns may be disposed between the first control electrode and the second control electrode. The second variable patterns may extend side by side in the first direction. The second control electrode may include second electrode patterns, which extend side by side in the first direction. Each of the second variable patterns may overlap one of the second electrode patterns.

An electrode insulating layer may be disposed between the first electrode patterns and the second electrode patterns.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure.

In the drawings:

FIG. 3 is a view showing a first control element of the display apparatus according to the aspect of the present disclosure;

FIG. 4 is a view showing a second control element of the display apparatus according to the aspect of the present disclosure;

DETAILED DESCRIPTION

Figure 1:
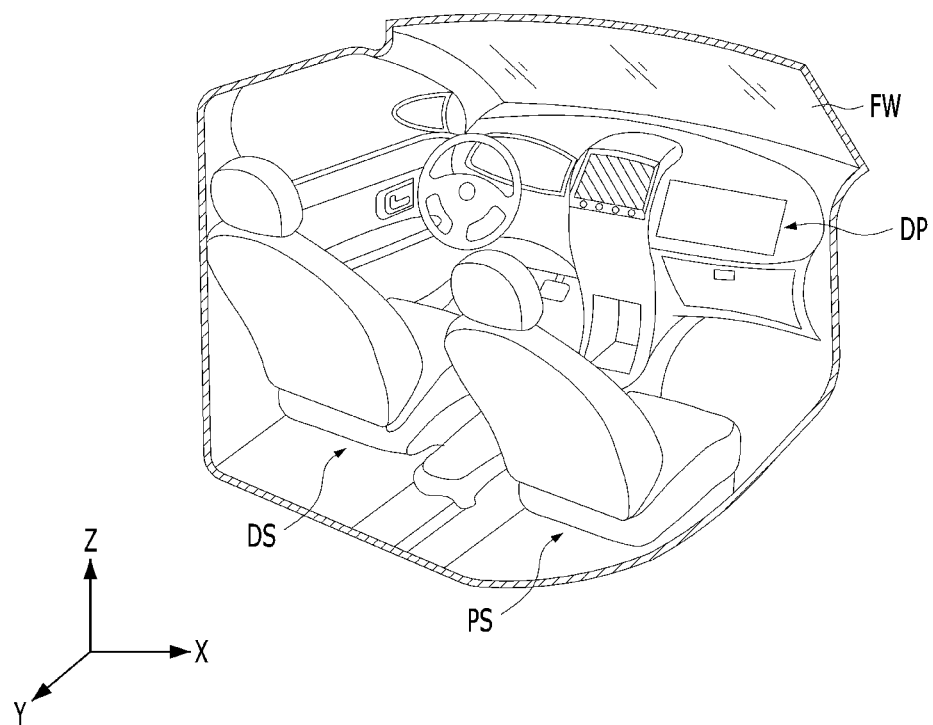
FIG. 1 is a view showing a place where a display apparatus according to an aspect of the present disclosure is used.

Hereinafter, details related to the above features, technical configurations, and operational effects of the aspects of the present disclosure will be clearly understood by the following detailed description with reference to the drawings, which illustrate some aspects of the present disclosure. Here, the aspects of the present disclosure are provided in order to allow the technical sprit of the present disclosure to be satisfactorily transferred to those skilled in the art, and thus the present disclosure may be embodied in other forms and is not limited to the aspects described below.

In addition, the same or extremely similar elements may be designated by the same reference numerals throughout the specification, and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

Here, terms such as, for example, "first" and "second" may be used to distinguish any one element with another element. However, the first element and the second element may be arbitrary named according to the convenience of those skilled in the art without departing the technical sprit of the present disclosure.

The terms used in the specification of the present disclosure are merely used in order to describe particular aspects, and are not intended to limit the scope of the present disclosure. For example, an element described in the singular form is intended to include a plurality of elements unless the context clearly indicates otherwise. In addition, in the specification of the present disclosure, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Unless otherwise defined, all terms (including technical and scientific terms) used herein have the same meaning as commonly understood by one of ordinary skill in the art to which example aspects belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

FIG. 1 is a view showing a place where a display apparatus according to an aspect of the present disclosure is used.

Figure 2:
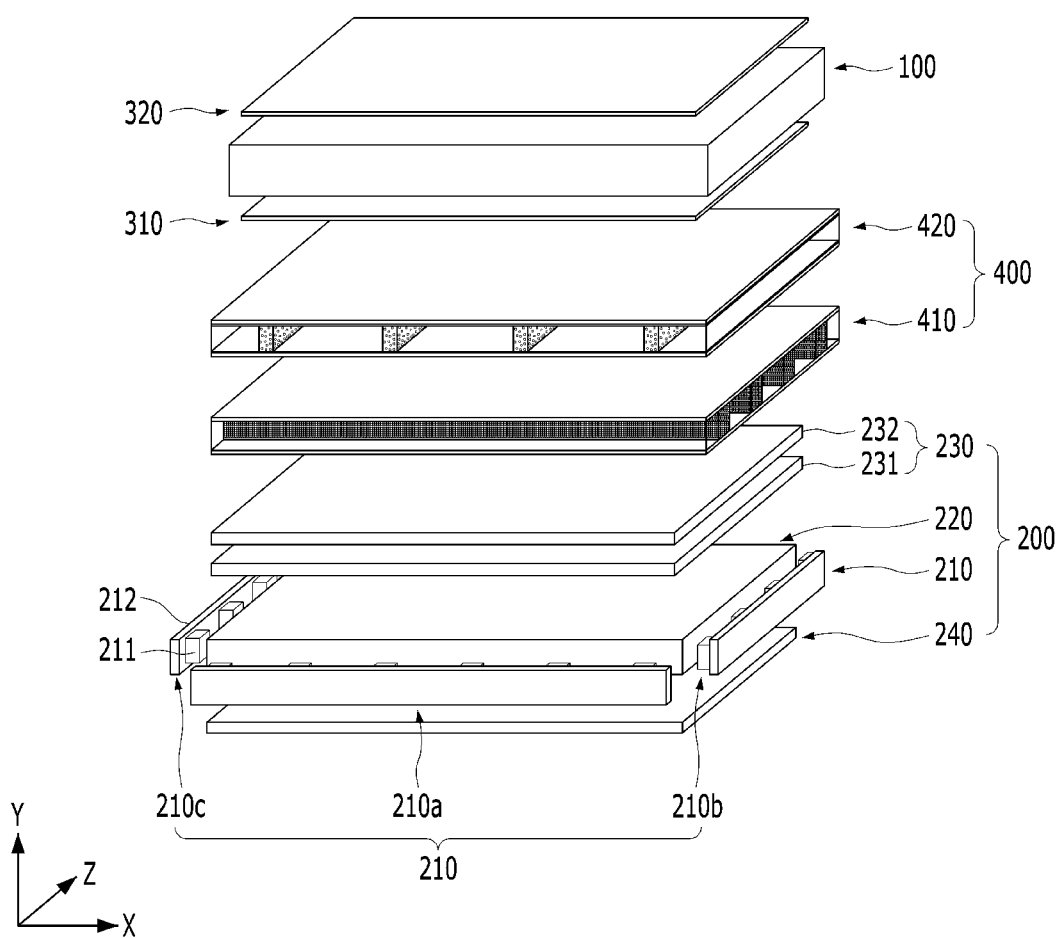
FIG. 2 is a view schematically showing the display apparatus according to the aspect of the present disclosure.

Referring to FIG. 1, the display apparatus DP according to the aspect of the present disclosure may be installed in front of a passenger seat PS of a vehicle. Thus, the display apparatus DP according to the aspect of the present disclosure may limit the viewing angle to prevent the accidents caused by the distraction of the driver sitting in the adjacent driver's seat when the vehicle is in motion. For example, the display apparatus DP according to the aspect of the present disclosure may include a viewing angle control unit 400 between a liquid crystal panel 100 and a back-light unit 200, as shown in FIGS. 2 to 4.

The liquid crystal panel 100 may realize an image provided to a user. For example, the liquid crystal panel 100 may include a liquid crystal layer between two substrates. The transmittance of the liquid crystal layer may be changed according to an electric field formed between a pixel electrode and a common electrode. For example, the liquid crystal layer may include a liquid crystal of IPS mode, ECB mode or TN mode. A linear polarizer 310 and 320 may be disposed an outer surface of the liquid crystal panel 100. For example, the liquid crystal panel 100 may be disposed between a first linear polarizer 310 and a second linear polarizer 320. The transmission axis of the second linear polarizer 320 may be perpendicular to the transmission axis of the first linear polarizer 310.

The back-light unit 200 may provide light to the liquid crystal panel 100. For example, the liquid crystal panel 100 may be disposed on the back-light unit 200. The back-light unit 200 may include a light-source element 210 and a light-guide plate 220. The light-source element 210 may be disposed on a side of the light-guide plate 220. The light-source element 210 may emit light. For example, the light-source element 210 may include a light-source 211 and a printed circuit board 212 in which the light-source 211 is mounted. The light-source 211 may include LED. The light incident from the light-source element 210 may be emitted through entire upper surface of the light-guide plate 220. For example, the light-guide plate 220 may function as a surface light source. For example, the liquid crystal panel 100 may be disposed on the upper surface of the light-guide plate 220.

The back-light unit 200 may include an optical sheet 230 disposed between the upper surface of the light-guide plate 220 and the liquid crystal panel 100. The optical sheet 230 may prevent the characteristics variation of the light provided to each region of the liquid crystal panel 100. The optical sheet 230 may include a plurality of optical films 231 and 232. For example, the optical sheet 230 may have a stacked structure of a diffusion film 231 and a prism film 232. The back-light unit 200 may include a reflective plate 240, which is disposed on a lower surface of the light-guide plate 220 opposite to the liquid crystal panel 100. The reflective plate 240 may reflect the light emitted through the lower surface of the light-guide plate 220 toward the liquid crystal panel 100. Thus, in the display apparatus according to the aspect of the present disclosure, loss of the light may be minimized.

The viewing angle control unit 400 may be disposed between the liquid crystal panel 100 and the back-light unit 200. For example, the viewing angle control unit 400 may be disposed between the optical sheet 230 of the back-light unit 200 and the first linear polarizer 310. The traveling direction of the light emitted from the back-light unit 200 may be limited by the viewing angle control unit 400. For example, the viewing angle control unit 400 may include a first control element 410 and a second control element 420.

The first control element 410 may include light-blocking patterns 415 disposed between a first lower control substrate 411 and a first upper control substrate 412. The light-blocking patterns 415 may extend side by side in a first direction X. The light-blocking patterns 415 may include a light-blocking material. For example, the light-blocking patterns 415 may include a black dye, such as carbon black. Thus, in the display apparatus DP according to the aspect of the present disclosure, the viewing angle in a second direction Z perpendicular to the first direction X may be limited. The first direction X may be a left and right direction (or horizontal direction) of the user, and the second direction Y may be a vertical direction of the user. For example, in the display apparatus DP according to the aspect of the present disclosure, the reflection of the realized image by a front window FW of the vehicle may be prevented by the light-blocking patterns 415. Therefore, in the display apparatus DP according to the aspect of the present disclosure, the distraction of the driver may be prevented.

The first control element 410 may include a first control insulating layer 416 surrounding the light-blocking patterns 415. The first control insulating layer 416 may include an insulating material. The first control insulating layer 416 may include a transparent material. For example, the light emitted from the back-light unit 200 may pass through the first control insulating layer 416 between the light-blocking patterns 415. A space between the first lower control substrate 411 and the first upper control substrate 412 may be completely filled by the light-blocking patterns 415 and the first control insulating layer 416. Thus, in the display apparatus DP according to the aspect of the present disclosure, the damage and the deformation of the light-blocking patterns 415 due to an external impact may be prevented.

The second control element 420 may include variable patterns 425 disposed between a second lower control substrate 421 and a second upper control substrate 422. The variable patterns 425 may extend in a direction perpendicular to the light-blocking patterns 415. For example, the variable patterns 425 may extend side by side in the second direction Z. A first control electrode 423 may be disposed between the second lower control substrate 421 and the variable patterns 425. A second control electrode 424 may be disposed between the variable patterns 425 and the second upper control substrate 422. For example, the variable patterns 425 may be disposed between the first control electrode 423 and the second control electrode 424. Each of the variable patterns 425 may be surrounded by a second control insulating layer 426. The second control insulating layer 426 may include an insulating material. The second control insulating layer 426 may include a transparent material. For example, the second control insulating layer 426 may include the same material as the first control insulating layer 416. The first control electrode 423 may extend between the second lower control substrate 421 and the second control insulating layer 426. The second control electrode 424 may extend between the second control insulating layer 426 and the second upper control substrate 422. The first control electrode 423 and the second control electrode 424 may include a conductive material. For example, the first control electrode 423 and the second control electrode 424 may be a transparent electrode made of a transparent conductive material, such as ITO and IZO. A space between the first control electrode 423 and the second control electrode 424 may be completely filled by the variable patterns 425 and the second control insulating layer 426. Thus, in the display apparatus DP according to the aspect of the present disclosure, the damage and the deformation of the variable patterns 425 due to the external impact may be prevented.

The transmittance of each variable patterns 425 may be changed according to a voltage applied to the first control electrode 423 and the second control electrode 424. For example, each of the variable patterns 425 may include a transparent fluid 425$f$ and black particles 425$p$. The transparent fluid 425$f$ of each variable pattern 425 may be disposed in a space defined by the second control insulating layer 426. The black particles 425$p$ may be dispersed in the transparent fluid 425$f$. For example, the black particles 425$p$ may move freely in the transparent fluid 425$f$. The black particles 425$p$ may include a material capable of blocking light. The black particles 425$p$ may be conductive. For example, the black particles 425$p$ may include an electronic ink. Thus, in the display apparatus DP according to the aspect of the present disclosure, the viewing angle in the first direction X may be selectively limited by the variable patterns 425 of the second control element 420.

Figure 5A:
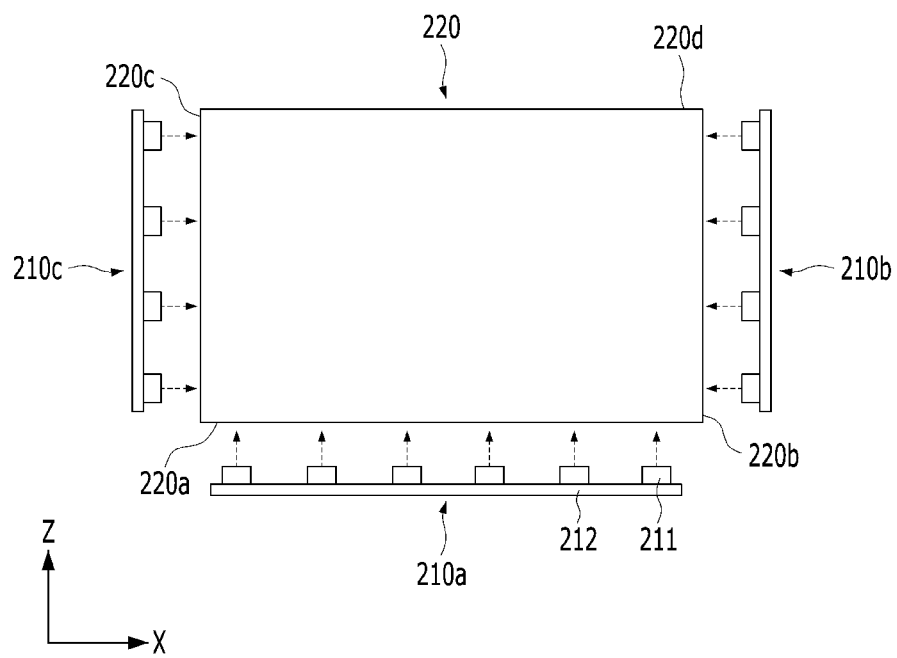
FIGS. 5A and 5B are views showing a travelling direction of light passing through the second control element, when a driving voltage is applied to a first control electrode and a second control electrode in the display apparatus according to the aspect of the present disclosure.
Figure 5B:
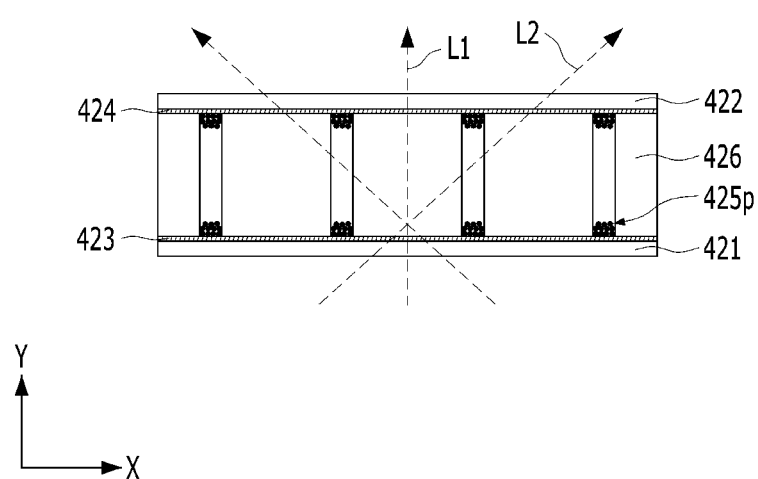
Figure 6A:
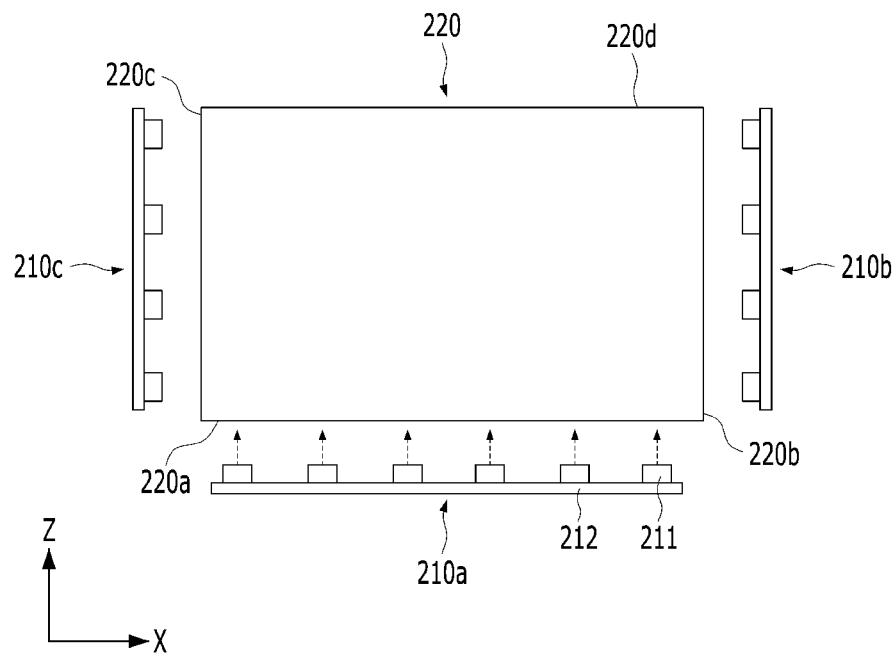
FIGS. 6A and 6B are views showing a travelling direction of light passing through the second control element, when a driving voltage is not applied to a first control electrode and a second control electrode in the display apparatus according to the aspect of the present disclosure.
Figure 6B:
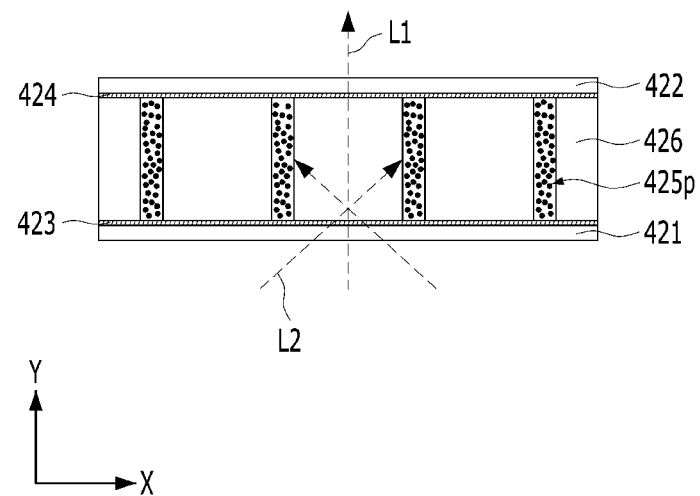

FIGS. 5A and 5B are views showing a traveling direction of light passing through the second control element 420, when a driving voltage is applied to the first control electrode 423 and the second control electrode 424 in the display apparatus DP according to the aspect of the present disclosure. FIGS. 6A and 6B are views showing a traveling direction of light passing through the second control element 420, when a driving voltage is not applied to the first control electrode 423 and the second control electrode 424 in the display apparatus DP according to the aspect of the present disclosure.

An operation of the display apparatus DP according to the aspect of the present disclosure is described with FIGS. 1 to 4, 5A, 5B, 6A and 6B. Firstly, in the display apparatus DP according to the aspect of the present disclosure, the black particles 425$p$ of each variable pattern 425 may move a surface of the first control electrode 423 or a surface of the second control electrode 424, when a driving voltage is applied to the first control electrode 423 and the second control electrode 424, as shown in FIGS. 1 to 4, 5A and 5B. thus, in the display apparatus DP according to the aspect of the present disclosure, the central region of each variable pattern 425 may become transparent. That is, in the display apparatus DP according to the aspect of the present disclosure, the light L1 traveling in a direction perpendicular to the upper surface of the light-guide plate 200 may pass between the variable patterns 425, and the light Le traveling in the first direction X may pass through the central region of each variable pattern 425. Therefore, the image realized by the display apparatus DP according to the aspect of the present disclosure may be recognized by the user and people around the user, for example, the driver sitting in the driver's seat.

In the display apparatus DP according to the aspect of the present disclosure, the light-guide plate 220 may include a first side 220a, a second side 220b, a third side 220c and a fourth side 220d. The second side 220b may be perpendicular to the first side 220a. The third side 220c may be opposite to the second side 220b. The fourth side 220d may be opposite to the first side 220a. For example, a planar shape of the light-guide plate 220 may be a square shape. The first side 220a of the light-guide plate 220 may extend in the same direction as the light-blocking patterns 415. For example, the first side 220a of the light-guide plate 220 may extend in the first direction X.

The light-source element 210 may include a first light-source device 210a, a second light-source device 210b and a third light-source device 210c. The first light-source device 210a may be disposed on the first side 220a of the light-guide plate 220. The second light-source device 210b may be disposed on the second side 220b of the light-guide plate 220. The third light-source device 210c may be disposed on the third side 220c of the light-guide plate 220. In the display apparatus DP according to the aspect of the present disclosure, all of the first light-source device 210a, the second light-source device 210b and the third light-source device 210c may emit the light, when the driving voltage is applied to the first control electrode 423 and the second control electrode 424. Thus, in the display apparatus DP according to the aspect of the present disclosure, the amount of the light L2 traveling in the first direction X may be increased. Therefore, in the display apparatus DP according to the aspect of the present disclosure, the visibility of people around the user, for example, the driver may be improved.

In the display apparatus DP according to the aspect of the present disclosure, the black particles 425p of each variable pattern 425 may be freely dispersed in the corresponding transparent fluid 425f, when the driving voltage is not applied to the first control electrode 423 and the second control electrode 424, as shown in FIGS. 1 to 4, 6A and 6B. Thus, in the display apparatus DP according to the aspect of the present disclosure, each of the variable patterns 425 may become an opaque region, entirely. That is, in the display apparatus DP according to the aspect of the present disclosure, the light L2 traveling in the first direction X may be blocked by the variable patterns 425. Therefore, the image realized by the display apparatus DP according to the aspect of the present disclosure may be not recognized by people around the user, for example, the driver sitting in the driver's seat.

In the display apparatus DP according to the aspect of the present disclosure, only the first light-source device 210a may emit the light, when the driving voltage is not applied to the first control electrode 423 and the second control electrode 424. Thus, in the display apparatus DP according to the aspect of the present disclosure, the amount of the light traveling in the first direction X may be reduced. That is, in the display apparatus DP according to the aspect of the present disclosure, the visibility of people around the user, for example, the driver may be decreased. The first side 220a of the light-guide plate 220 may have a length longer than the second side 220b and the third side 220c of the light-guide plate 220. Therefore, in the display apparatus DP according to the aspect of the present disclosure, the decrease in visibility of the user according to limitation of the viewing angle may be minimized.

Accordingly, the display apparatus DP according to the aspect of the present disclosure may include the viewing angle control unit 400 between the back-light unit 200 and the liquid crystal panel 100, wherein the viewing angle control unit 400 may include the light-blocking patterns 415 extending in the first direction X and the variable patterns 425 extending in the second direction Z, wherein each of the variable patterns 425 may be controlled by the first control electrode 423 and the second control electrode 424. Thus, in the display apparatus DP according to the aspect of the present disclosure, the viewing angle may be selectively limited. Therefore, in the display apparatus DP according to the aspect of the present disclosure, the accidents due to the distraction of people around the user caused by the realized image may be prevented.

And, in the display apparatus DP according to the aspect of the present disclosure, the back-light unit 200 may include the light-source devices 210a, 210b and 210c on three side 220a, 220b and 220c of the light-guide plate 220, wherein the second light-source device 210b and the third light-source device 210c, which are disposed on the second side 220b and the third side 220c of the light-guide plate 220 extending in the second direction Z may operate according to whether the driving voltage is applied to the first control electrode 423 and the second control electrode 424. Thus, in the display apparatus DP according to the aspect of the present disclosure, the limitation of the viewing angle may be effectively performed, and the visibility deviation caused by the change of the viewing angle may be minimized.

Figure 7:
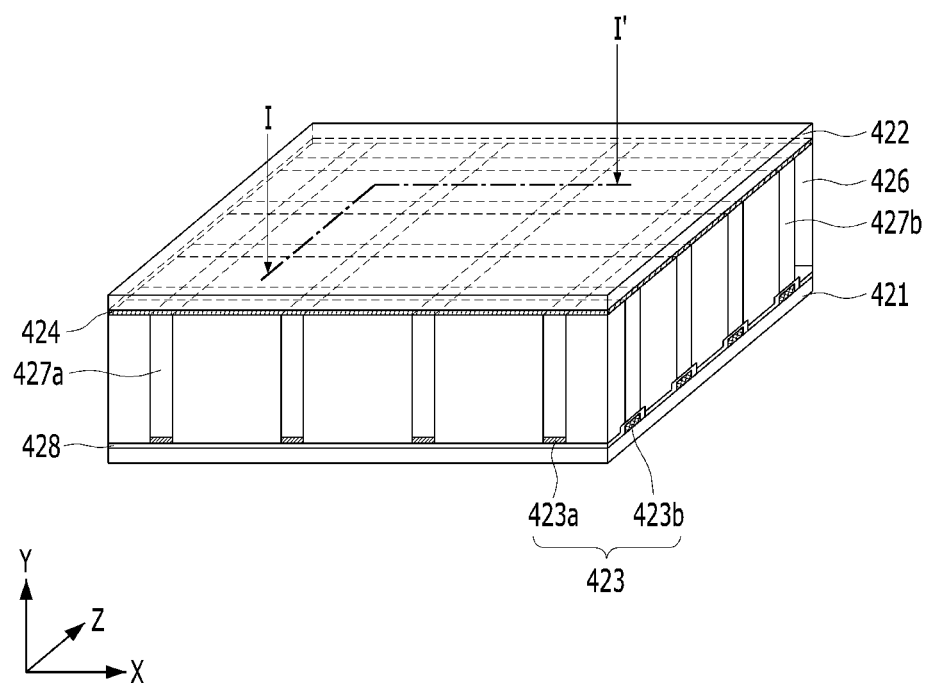
FIGS. 7, 8A, 8B, 9, 10, 11A and 11B are views showing the display apparatus according to another aspect of the present disclosure.
Figure 8A:
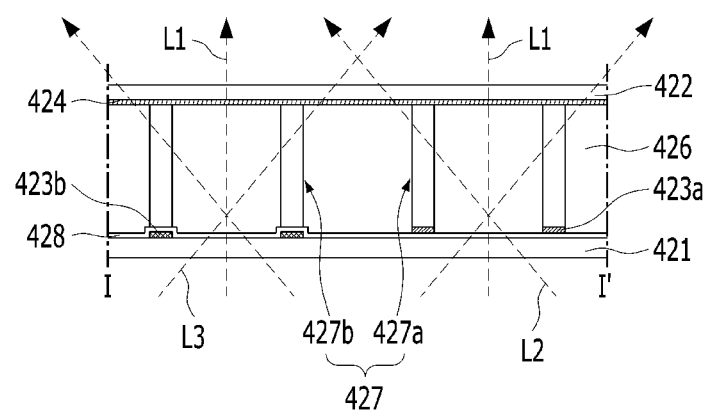
Figure 8B:
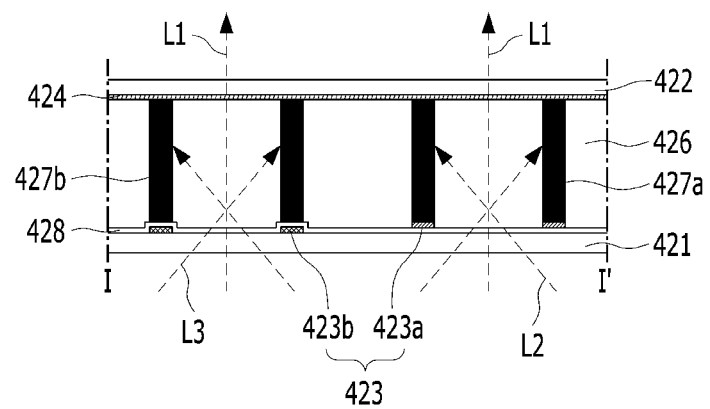
Figure 9:
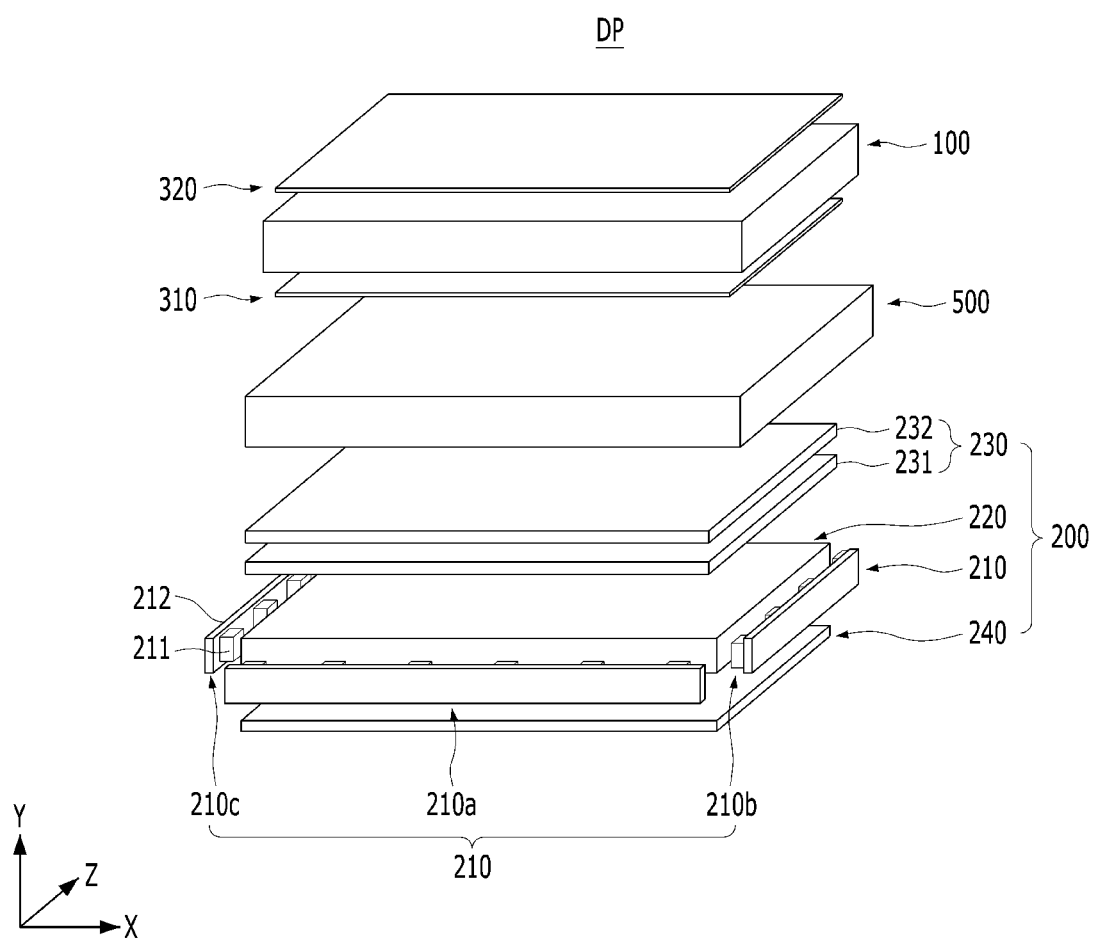
Figure 10:
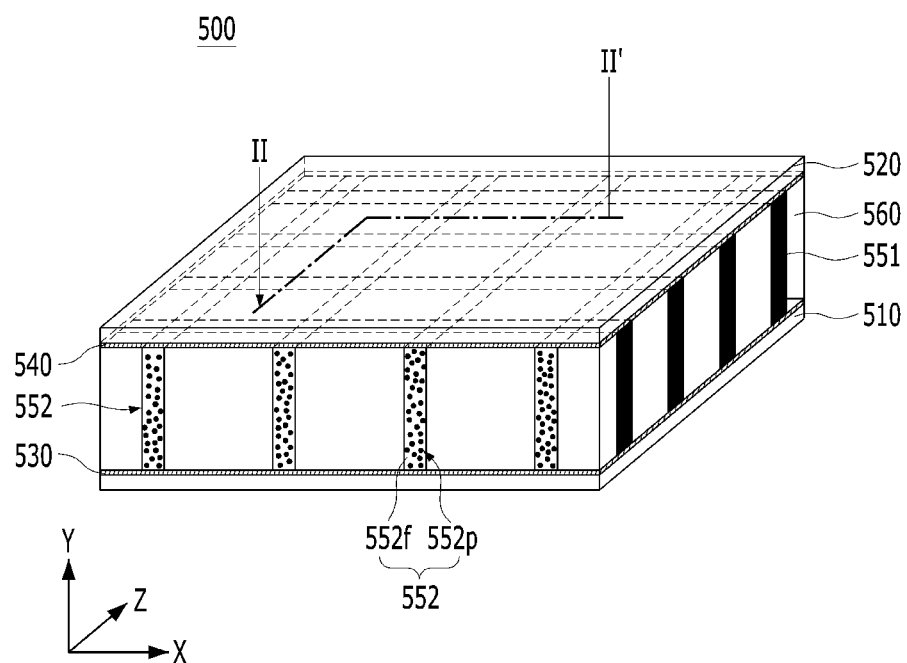
Figure 11A:
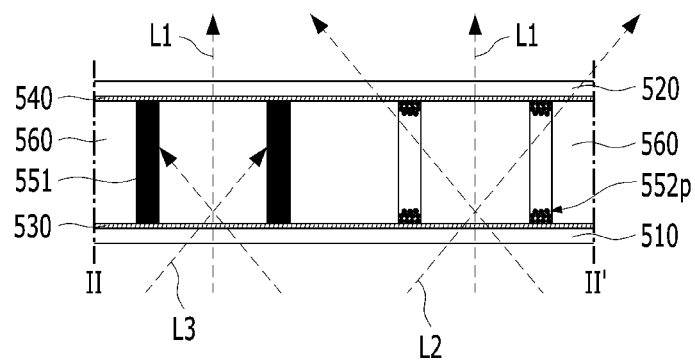
Figure 11B:
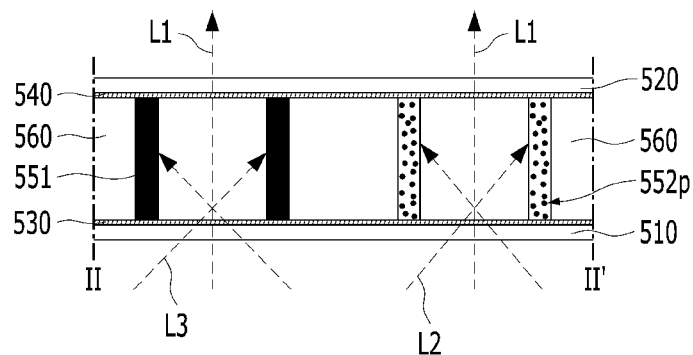

The display apparatus DP according to the aspect of the present disclosure is described that each of the variable patterns 425 includes the black particles 425p. However, the display apparatus according to another aspect of the present disclosure may include the variable patterns formed of various materials. For example, in the display apparatus according to another aspect of the present disclosure, the variable patterns 427 may include an electrochromic material, as shown in FIGS. 7, 8A and 8B. The electrochromic material may be a material that changes color according to a voltage applied to the first control electrode 423 and the second control electrode 424. For example, the electrochromic material may include a metal oxide, such as tungsten oxide (WO), vanadium oxide (VO), titanium oxide (TiO) and molybdenum oxide (MoO).

The variable patterns 427 may include first variable patterns 427a extending side by side in the second direction Z and second variable patterns 427b extending side by side in the first direction X perpendicular to the second direction Z. The first variable patterns 427a and the second variable patterns 427b may be colored at the same time. For example, the first variable patterns 427a and the second variable patterns 427b may be not colored, when a voltage is not applied to the first control electrode 423 and the second control electrode 424, as shown in FIG. 8A. The first variable patterns 427a and the second variable patterns 427b may be colored black, when a voltage is applied to the first control electrode 423 and the second control electrode 424, as shown in FIG. 8B. Thus, in the display apparatus according to another aspect of the present disclosure, the selective limitation of the viewing angle may be effectively performed. That is, in the display apparatus according to another aspect of the present disclosure, the light traveling toward people around the user, for example the driver may be effectively blocked by the colored variable patterns 427.

In the display apparatus according to another aspect of the present disclosure, the first control electrode 423 may include first electrode patterns 423a and second electrode patterns 423b. The first electrode patterns 423a may extend side by side in the second direction Z. Each of the first electrode patterns 423a may overlap one of the first variable patterns 427a. For example, each of the first electrode patterns 423a may have a horizontal width same as the corresponding first variable pattern 427a. The second electrode patterns 423b may extend side by side in the first direction X. Each of the second electrode patterns 423b may overlap one of the second variable patterns 427b. For example, each of the second electrode patterns 423b may have a horizontal width same as the corresponding second variable pattern 427b. The first electrode pattern 423a and the second electrode pattern 423b may include a conductive material. The second electrode patterns 423b may be insulated from the first electrode patterns 423a. For example, an electrode insulating layer 428 may be disposed between the first electrode patterns 423a and the second electrode patterns 423b. The electrode insulating layer 428 may include an insulating material. For example, the electrode insulating layer 428 may include an inorganic material, such as silicon oxide (SiO) and silicon nitride (SiN). The second electrode patterns 423b may be disposed between the second lower control substrate 421 and the electrode insulating layer 428. The first electrode patterns 423a may be disposed on the electrode insulating layer 428. For example, each of the second electrode patterns 423b may intersect the first electrode patterns 423a. Thus, in the display apparatus according to another aspect of the present disclosure, a voltage may be applied to the first electrode patterns 423a or the second electrode patterns 423b. For example, in the display apparatus according to another aspect of the present disclosure, the first variable patterns 427a or the second variable patterns 427b may be colored. Therefore, in the display apparatus according to another aspect of the present disclosure, the degree of freedom for a method of limiting the viewing angle may be improved.

The display apparatus according to aspect of the present disclosure is described that the viewing angle control unit 400 has a stacked structure of the first control element 410 and the second control element 420. However, in the display apparatus according to another aspect of the present disclosure, the viewing angle control unit may have various structure. For example, in the display apparatus according to another aspect of the present disclosure, the light-blocking patterns 551 and the variable patterns 552 of the viewing angle control unit 500 disposed between the back-light unit 200 and the liquid crystal panel 100 may be disposed between the first control substrate 510 and the second control substrate 520, as shown in FIGS. 9, 10, 11A and 11B. The first control electrode 530 may be disposed on a surface of the first control substrate 510 toward the second control substrate 520. The second control electrode 540 may be disposed on a surface of the second control substrate 520 toward the first control substrate 510. The light-blocking patterns 551 and the variable patterns 552 may be disposed between the first control electrode 530 and the second control electrode 540. The light-blocking patterns 551 and the variable patterns 552 may be surrounded by a control insulating layer 560. For example, a space between the first control electrode 530 and the second control electrode 540 may be completely filled by the light-blocking patterns 551, the variable patterns 552 and the control insulating layer 560.

The light-blocking patterns 551 may extend in the first direction X. The variable patterns 552 may extend in the second direction Z perpendicular to the first direction X. Each of the variable patterns 552 may not cross the light-blocking patterns 551. For example, each of the variable patterns 552 may be disposed between the light-blocking pattern 551.

The light-blocking pattern 551 may limit the viewing angle in the second direction Z, regardless of whether the driving voltage is applied to the first control electrode 530 and the second control electrode 540. The transmittance of each variable pattern 552 may be changed according to whether the driving voltage is applied to the first control electrode 530 and the second control electrode 540. For example, the viewing angle in the first direction X may be limited by the variable patterns 552, when the driving voltage is not applied to the first control electrode 530 and the second control electrode 540. Therefore, in the display apparatus according to another aspect of the present disclosure, the degree of freedom for the configuration of the viewing angle control unit 500 may be improved.

In the result, the display apparatus according to the aspects of the present disclosure may include the viewing angle control unit between the back-light unit and the liquid crystal panel, wherein the viewing angle control unit includes the light-blocking patterns extending in the first direction and the variable patterns extending in the second direction perpendicular to the first direction, and wherein the transmittance of each variable pattern may be changed according to the voltage applied to the first control electrode and the second control electrode. Thus, in the display apparatus according to aspects of the present disclosure, the viewing angle may be selectively limited by the variable patterns. Thereby, in the display apparatus according to the aspects of the present disclosure, the accidents caused by the distraction of people around the user may be prevented.

What is claimed is:

1. A display apparatus comprising:
   a liquid crystal panel disposed on a back-light unit; and
   a viewing angle control unit disposed between the back-light unit and the liquid crystal panel,
   wherein the viewing angle control unit includes light-blocking patterns having a light-blocking material and variable patterns disposed between a first control electrode and a second control electrode,
   wherein the variable patterns are extended in a direction perpendicular to the light-blocking patterns,
   wherein transmittance of each variable pattern is changed according to a voltage applied to the first control electrode and the second control electrode,
   wherein the back-light unit includes a light-guide plate and a light-source element,
   wherein the light-guide plate includes a second side perpendicular to a first side, a third side opposite to the second side, and a fourth side opposite to the first side,
   wherein the light-source element includes a first light-source device on the first side of the light-guide plate, a second light-source device on the second side of the light-guide plate, and a third light-source device on the third side of the light-guide plate,
   wherein the first side of the light-guide plate extends in a same direction as the light-blocking patterns, and
   wherein the operation of the second light-source device on the second side of the light-guide plate, and the operation the third light-source device on the third side of the light-guide plate are controlled according to the transmittance of each variable pattern.

2. The display apparatus according to claim 1, wherein the light-blocking material includes a black dye.

3. The display apparatus according to claim 1, wherein each of the variable patterns includes a transparent fluid and black particles dispersed in the transparent fluid.

4. The display apparatus according to claim 3, wherein the viewing angle control unit further include a control insulating layer surrounding each variable pattern.

5. The display apparatus according to claim 1, the first light-source device on the first side of the light-guide plate, the second light-source device on the second side of the light-guide plate, and the third light-source device on the third side of the light-guide plate are controlled, respectively.

6. The display apparatus according to claim 1, wherein the first side of the light-guide plate has a length longer than the second side and the third side of the light-guide plate.

7. The display apparatus according to claim 1, wherein the light-blocking patterns are disposed between the first control electrode and the second control electrode.

8. A display apparatus comprising:
a back-light unit, the back-light unit includes a light-guide plate and a light-source element;
a viewing angle control unit disposed on the back-light unit; and
a liquid crystal panel disposed on the viewing angle control unit,
wherein the light-guide plate includes a second side perpendicular to a first side, a third side opposite to the second side, and a fourth side opposite to the first side, and
wherein the light-source element includes a first light-source device on the first side of the light-guide plate, a second light-source device on the second side of the light-guide plate, and a third light-source device on the third side of the light-guide plate,
wherein the viewing angle control unit includes light-blocking patterns extended in a first direction same as the first side of the light-guide plate, and a first variable patterns extended in a second direction perpendicular to the first direction,
wherein the first variable patterns are disposed between a first control electrode and a second control electrode,
wherein each of the first variable patterns includes an electrochromic material, and
wherein the operation of the second light-source device on the second side of the light-guide plate, and the operation the third light-source device on the third side of the light-guide plate are controlled according to transmittance of each of the first variable patterns.

9. The display apparatus according to claim 8, wherein each of the first variable patterns includes metal oxide.

10. The display apparatus according to claim 8, wherein the first control electrode includes first electrode patterns extended side by side in the second direction, and
wherein each of the first variable patterns overlaps with one of the first electrode patterns.

11. The display apparatus according to claim 10, wherein each of the first variable patterns has a same horizontal width as a corresponding first electrode pattern.

* * * * *